(12) United States Patent  
Matsubara (10) Patent No.: US 9,229,306 B2
(45) Date of Patent: *Jan. 5, 2016

(54) ILLUMINATION OPTICAL SYSTEM AND PROJECTOR INCLUDING FLUOROPHORE

(71) Applicant: NEC Display Solutions, Ltd., Tokyo (JP)

(72) Inventor: Masateru Matsubara, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,364

(22) Filed: Mar. 2, 2015

(65) Prior Publication Data

US 2015/0177607 A1   Jun. 25, 2015

Related U.S. Application Data

(63) Continuation of application No. 14/004,131, filed as application No. PCT/JP2011/056525 on Mar. 18, 2011, now Pat. No. 8,985,775.

(51) Int. Cl.
*G03B 21/14* (2006.01)
*G03B 21/20* (2006.01)
(Continued)

(52) U.S. Cl.
CPC ............. *G03B 21/2073* (2013.01); *F21K 2/06* (2013.01); *G02B 26/008* (2013.01);
(Continued)

(58) Field of Classification Search
CPC ...... G03B 21/204; G03B 21/20; G03B 21/00; H04N 9/31–9/3197
USPC ........ 362/19, 35, 259, 264, 296.01, 297–301, 362/307–308, 311.01, 311.11–311.12; 353/20, 22–24, 38, 48–49, 82–84, 119; 352/242, 89, 107, 114, 120
See application file for complete search history.

(56) References Cited

U.S. PATENT DOCUMENTS 7,540,616 B2    6/2009  Conner
2005/0231651 A1* 10/2005  Myers et al. .................. 348/744
(Continued)

FOREIGN PATENT DOCUMENTS

CN           1517785 A      8/2004
CN         102155639 A      8/2011
(Continued)

OTHER PUBLICATIONS

U.S. Notice of Allowance dated Nov. 17, 2014 in co-pending U.S. Appl. No. 14/004,131.
(Continued)

*Primary Examiner* — Anne Hines
*Assistant Examiner* — Jose M Diaz
(74) *Attorney, Agent, or Firm* — McGinn IP Law Group, PLLC.

(57) ABSTRACT

A projector includes an illumination optical system, an image formation element that spatially modulates light from the illumination optical system, and a projection lens that projects the spatially modulated light. The illumination optical system includes a light source that emits light of a first wavelength, a fluorophore unit including a reflection region reflecting the light of the first wavelength and a fluorophore region including a fluorophore emitting fluorescent light of a wavelength that differs from the first wavelength by irradiation of the light of the first wavelength, an optical element reflecting the light of the first wavelength, and a quarter-wave plate provided on a light path between the optical element and the fluorophore unit.

20 Claims, 3 Drawing Sheets

(51) Int. Cl.
*G02B 26/00* (2006.01)
*H04N 5/74* (2006.01)
*G03B 33/08* (2006.01)
*F21K 2/06* (2006.01)
*H04N 9/31* (2006.01)

(52) U.S. Cl.
CPC ......... *G03B 21/204* (2013.01); *G03B 21/2066* (2013.01); *G03B 33/08* (2013.01); *H04N 5/74* (2013.01); *H04N 9/3111* (2013.01)

(56) References Cited

U.S. PATENT DOCUMENTS

| | | |
|---|---|---|
| 2007/0146639 A1 | 6/2007 | Conner |
| 2009/0284148 A1 | 11/2009 | Iwanaga |
| 2011/0075103 A1 | 3/2011 | Ogawa et al. |
| 2011/0075106 A1 | 3/2011 | Shibasaki |
| 2011/0228232 A1 | 9/2011 | Sakata et al. |
| 2011/0261326 A1 | 10/2011 | Wang et al. |
| 2011/0310353 A1 | 12/2011 | Maeda |
| 2012/0033185 A1 | 2/2012 | Chang |

FOREIGN PATENT DOCUMENTS

| | | |
|---|---|---|
| EP | 1 605 199 A2 | 12/2005 |
| EP | 2 270 589 A1 | 1/2011 |
| EP | 2 360 523 A1 | 8/2011 |
| JP | 2006-138965 A | 6/2006 |
| JP | 2009-521786 A | 6/2009 |
| JP | 2009-277516 A | 11/2009 |
| JP | 2010-237443 A | 10/2010 |
| JP | 2010-256457 A | 11/2010 |
| JP | 2010-262312 A | 11/2010 |
| JP | 2011-059540 A | 3/2011 |
| JP | 2012-108486 | 6/2012 |
| JP | 2012-123180 A | 6/2012 |
| WO | WO 2007-075661 A1 | 7/2007 |

OTHER PUBLICATIONS

Extended European Search Report dated Oct. 10, 2014.
Japanese Office Action dated Sep. 29, 2014 with partial English translation thereof.
Chinese Office Action dated Dec. 3, 2014 with partial English translation thereof.
International Search Report (ISR) (PCT/ISA/210), in PCT/JP2011/056525, dated Jun. 14, 2011.
Japanese Office Action dated Sep. 15, 2015 with a partial English translation.

* cited by examiner

FIG.5

ILLUMINATION OPTICAL SYSTEM AND PROJECTOR INCLUDING FLUOROPHORE

The present application is a Continuation application of U.S. patent application Ser. No. 14/004,131, filed on Sep. 9, 2013, which is based on International Application No. PCT/JP2011/056525, filed on Mar. 18, 2011, the entire contents of which are incorporated herein by reference.

TECHNICAL FIELD

The present invention relates to an illumination optical system including a fluorophore unit that emits fluorescent light due to excitation light from a light source and relates to a projector including the illumination optical system.

BACKGROUND

Various illumination optical systems are currently proposed as the illumination optical system used in a projector such as an LED (Liquid Crystal Display) projector or a DLP (Digital Light Processing) projector.

Japanese Unexamined Patent Application Publication No. 2010-237443 (hereinbelow referred to as Patent Document 1) and Japanese Unexamined Patent Application Publication No. 2010-256457 (hereinbelow referred to as Patent Document 2) disclose illumination optical systems and projectors in which a fluorophore is irradiated by an excitation light to obtain light emission of a predetermined wavelength band from a fluorophore.

The illumination optical system (light source device) disclosed in each of these patent documents is equipped with a light source that irradiates laser light of the blue wavelength band and a light-emitting wheel on which is provided a light-emitting substance that emits light with light irradiated from the light source as excitation light. The light-emitting wheel is provided with: a red region in which a light-emitting substance is provided that emits light of the red wavelength band when excited by light from the light source, a green region in which a light-emitting substance is provided that emits light of the green wavelength band, and a blue region that transmits light of the blue wavelength band. The light-emitting substances of the light-emitting wheel are formed on a reflection layer.

The light-emitting wheel is configured so as to be rotatable. Due to the rotation of the fluorophore wheel, blue light that is emitted from the light source successively irradiates the red region, the green region, and the transmission region of the light-emitting wheel. The red light and green light generated from the fluorophores are reflected by the reflection layer.

Red light and green light that are reflected by the reflection layer and blue light that is transmitted by the transmission region are combined by a dichroic mirror or relay optical system. The combined light is irradiated upon a digital mirror device (DMD). Light of each color that is emitted in time divisions by the light-emitting wheel is spatially modulated according to input images by the DMD and projected by way of a projection lens onto a screen.

LITERATURE OF THE PRIOR ART

Patent Documents

Patent Document 1: Japanese Unexamined Patent Application Publication No. 2010-237443

Patent Document 2: Japanese Unexamined Patent Application Publication No. 2010-256457

SUMMARY

Technical Problem

In the case of the illumination optical systems described in Patent Document 1 and Patent Document 2, the light path of blue light differs from the light path of red light and green light. This difference occurs because the blue light is transmitted through the fluorophore wheel while the red light and green light are reflected by the fluorophore wheel. As a result, the optical system through which the blue light passes differs from the optical system through which the red light and green light pass.

In order for the blue light and red and green light that pass over different light paths to be emitted from the illumination optical system in the same direction, an optical system is absolutely necessary that combines the light paths of the light of each color. The problem therefore arises in which the size of the illumination optical system increases or in which the number of optical parts that make up the illumination optical system increases.

A compact illumination optical system having few optical parts is therefore desired in the illumination optical system that includes a fluorophore that produces fluorescent light by the irradiation of excitation light.

Solution to Problem

The illumination optical system of one aspect of the present invention comprises: a light source emitting light of a first wavelength; a fluorophore unit; an optical element; and a quarter-wave plate that is provided on the light path between the optical element and the fluorophore unit. The fluorophore unit includes: a fluorophore region in which a fluorophore that, by the irradiation of light of the first wavelength, emits fluorescent light of a wavelength that differs from the first wavelength, and a reflection region that reflects light of the first wavelength. The fluorophore unit can move such that light from the light source is successively irradiated on the fluorophore region and the reflection region. The optical element separates light of the first wavelength into a first linearly polarized light component and a second linearly polarized light component that is orthogonal to the first linearly polarized light component and guides the first linearly polarized light component that is emitted from the light source to the fluorophore unit. Light that is reflected by the reflection region and light emitted by the fluorophore region are again irradiated into the optical element. The optical element emits light of the first wavelength that was reflected by the reflection region and fluorescent light that was emitted by the fluorophore region in the same direction.

The projector of the present invention includes the above-described illumination optical system.

According to the above-described configuration, light of the first wavelength that is reflected in the fluorophore unit and fluorescent light that is emitted from a fluorophore both pass by way of the same light path and optical system. Accordingly, the number of constituent parts of the illumination optical system is decreased and the size of the illumination optical system is reduced.

The above and other objects, characteristics, and merits of the present invention will become clear from the following explanation that refers to the accompanying drawings that present examples of the present invention.

DESCRIPTION OF EMBODIMENTS

Exemplary embodiments of the present invention are next described with reference to the accompanying drawings.

Figure 1:
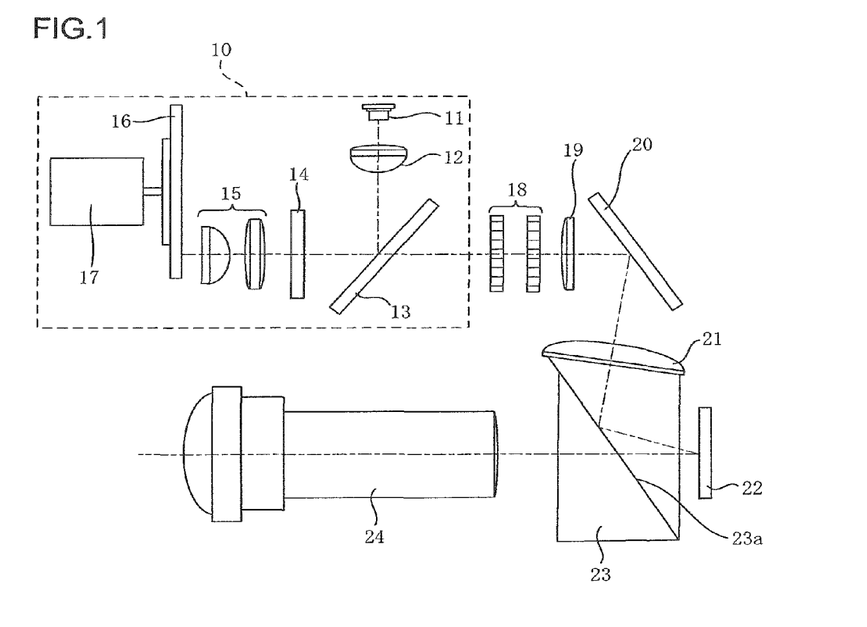
FIG. 1 is a schematic view showing the configuration of a projector that includes the illumination optical system according to the first exemplary embodiment of the present invention.

FIG. 1 shows the configuration of a projector that includes the illumination optical system according to the first exemplary embodiment of the present invention. The projector includes: illumination optical system 10, image formation element 22 that spatially modulates light from illumination optical system 10, and projection lens 24 that projects light that was spatially modulated by image formation element 22.

Illumination optical system 10 includes: light source 11 that emits light of a first wavelength, optical element 13, quarter-wave plate 14, and fluorophore unit 16. Fluorophore unit 16 includes fluorophore that emits fluorescent light by the irradiation of light of the first wavelength. Light source 11 functions as a light source that not only emits light of the first wavelength that is emitted from illumination optical system 10 but also irradiates excitation light onto the fluorophore.

Quarter-wave plate 14 is provided between optical element 13 and fluorophore unit 16. As needed, illumination optical system 10 may also include, for example, collimators 12 and 15.

Figure 2:
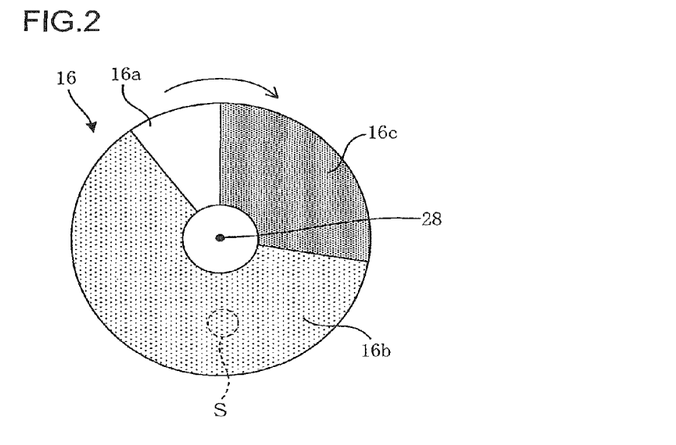
FIG. 2 is a plan view showing one surface upon which light from a light source is irradiated in the fluorophore unit shown in FIG. 1.

FIG. 2 is a plan view of fluorophore unit 16 as seen from the direction of the incidence of excitation light. Fluorophore unit 16 includes reflection region 16a and fluorophore regions 16b and 16c. Reflection region 16a is a region having a reflection film or mirror that reflects at least light of the first wavelength.

In the example shown in FIG. 2, the fluorophore regions include: first fluorophore region 16b in which a fluorophore is provided that, by the irradiation of light of the first wavelength, emits light of a second wavelength that is longer than the first wavelength; and second fluorophore region 16c in which a fluorophore is provided that, by the irradiation of light of the first wavelength, emits light of a third wavelength that is even longer than the second wavelength. In fluorophore regions 16b and 16c, the fluorophores are provided on a reflection surface that reflects light.

In order to realize a projector capable of displaying full-color images in the present exemplary embodiment, the light of the first wavelength is blue light, the light of the second wavelength is green light, and the light of the third wavelength is red light.

Fluorophore unit 16 is able to move such that the irradiation spot S of light from light source 11 irradiates reflection region 16a and fluorophore regions 16b and 16c in time divisions. More specifically, fluorophore unit 16 is configured to freely rotate around rotation axis 28 that is orthogonal to the surface on which the reflection region and the fluorophore regions are provided. Fluorophore unit 16 is caused to rotate by motor 17. The light from light source 11 successively irradiates reflection region 16a and fluorophore regions 16b and 16c due to the rotation of fluorophore unit 16.

In the example shown in FIG. 2, reflection region 16a and fluorophore regions 16b and 16c are generally fan-shaped regions having a central angle of a predetermined size. The proportions of each of the central angles of reflection region 16a and fluorophore regions 16b and 16c match the proportions of time when light is irradiated from light source 11 to each of the corresponding regions. Accordingly, the sizes of reflection region 16a and fluorophore regions 16b and 16c, which are the central angles in this case, are set according to, for example, the use of the illumination optical system.

In the present exemplary embodiment, the sizes of reflection region 16a and each of fluorophore regions 16b and 16c can be determined based on the intensity and chromaticity coordinates of light that is projected on a screen by way of projection lens 24 of the projector. In particular, the proportions of the central angles of reflection region 16a and fluorophore regions 16b and 16c are preferably determined by giving consideration to the intensity and chromaticity of white light that is formed by combining the light of each color.

Optical element 13 guides the first linearly polarized light component of light that is emitted from light source 11 to fluorophore unit 16. The light that is reflected and the light that is emitted by the fluorophores in fluorophore unit 16 are again irradiated into optical element 13. Optical element 13 emits the light of the first wavelength that is reflected in fluorophore unit 16 and light of the second wavelength that is emitted in fluorophore unit 16 in the same direction.

A dichroic mirror having a predetermined spectral transmittance characteristic can be used as this optical element 13.

In the above-described exemplary embodiment, the first linearly polarized light component is an S-polarized light component that is orthogonal to the incidence plane on dichroic mirror 13. The second linearly polarized light component is a P-polarized light component that is parallel to the incidence plane on dichroic mirror 13.

Figure 3:
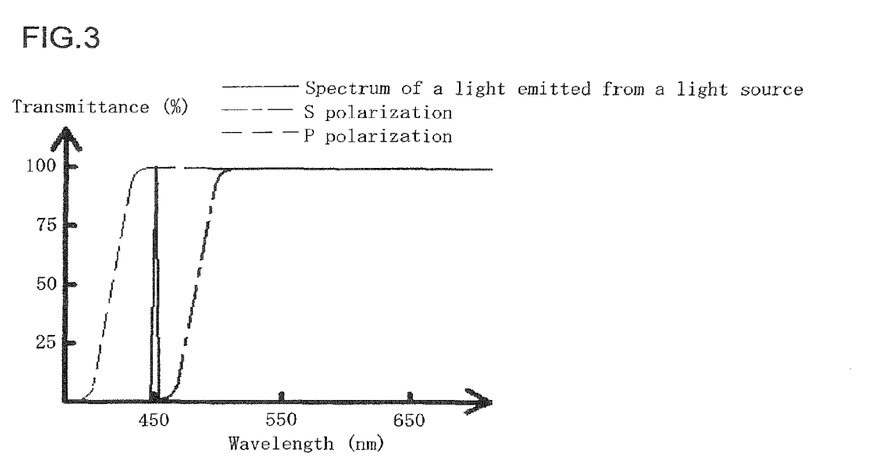
FIG. 3 is a graph showing the transmission property of light of the optical element belonging to the illumination optical system according to the first exemplary embodiment.

FIG. 3 shows the spectral transmittance characteristic of dichroic mirror 13 and the spectrum of light that is transmitted from light source 11. Dichroic mirror 13 has a characteristic such that the S-polarized light component of blue light of a wavelength on the order of 450 nm is reflected and the P-polarized light component of blue light is transmitted, whereby dichroic mirror 13 is able to separate light that is emitted from light source 11 into an S-polarized light component and a P-polarized light component that is orthogonal to the S-polarized light component. Dichroic mirror 13 guides substantially only light of the S-polarized light component to fluorophore unit 16.

More specifically, relating to the S-polarized light component, dichroic mirror 13 reflects light of wavelengths no greater than the wavelength of blue light and transmits light of wavelengths sufficiently longer than the wavelength of blue light. Further, relating to the P-polarized light component, dichroic mirror 13 reflects light of sufficiently shorter wavelengths than the wavelength of blue light and transmits light of wavelengths equal to or greater than the wavelength of blue light. As a result, dichroic mirror 13 reflects the S-polarized light component and transmits the P-polarized light component in the wavelength band of blue light. The spectrum of light that is emitted from light source 11 belongs to the wavelength band of this blue light.

Dichroic mirror 13 can be constituted by a multilayer film of dielectrics each having different refractive indices. The dichroic mirror having the spectral reflectance characteristic shown in FIG. 3 is easily fabricated by appropriately adjusting the refractive indices of each of the dielectric films, the film thicknesses, and the number of laminated layers of dielectrics to determine the desired cutoff wavelength.

In the present exemplary embodiment, light source 11 is preferably a component that emits light having substantially only the S-polarized light component. Most of the light from light source 11 is guided through dichroic mirror 13 to fluorophore unit 16, whereby the efficiency of the utilization of light of illumination optical system 10 is improved. A blue laser that emits light of a blue wavelength, for example, a wavelength in the vicinity of 450 nm, can be used as this light source 11.

When the light source of the blue excitation light that excites the fluorophores is a laser, irradiation spot S of the excitation light can be made an extremely small surface area. As a result, the irradiation surface area upon fluorophore unit 16 can be reduced, the etendue can be decreased, and a high-efficiency illumination optical system can be realized.

The light paths of the light in the illumination optical system of the configuration shown in FIG. 1 are next described. Light generated from light source 11 is converted to parallel light by collimator 12. The S-polarized light component of this parallel light is reflected by dichroic mirror 13 and guided in the direction of fluorophore unit 16.

In FIG. 1, collimator 12 is made up of one lens, but collimator 12 may be a lens system made up of a plurality of lenses.

S-polarized light that is reflected by dichroic mirror 13 passes by way of quarter-wave plate 14 and collimator 15 and is then incident to fluorophore unit 16. The S-polarized light is converted to circularly polarized light by quarter-wave plate 14, and this circularly polarized light is condensed on reflection region 16a or fluorophore regions 16b and 16c of fluorophore unit 16.

In FIG. 1, collimator 15 is a lens system made up of two lenses, but collimator 15 may be one lens or may be a lens system made up of three or more lenses.

When light of the first wavelength is irradiated upon first fluorophore region 16b of fluorophore unit 16, green light is emitted from the fluorophore. This green light advances in the opposite direction on the light path of blue light that is incident to fluorophore unit 16 and is converted to parallel light by collimator 15.

Green light that has been converted to parallel light is transmitted through quarter-wave plate 14 and again irradiated into dichroic mirror 13. The Lambert diffused light that is emitted from the fluorophore is unpolarized light, i.e., randomly polarized light, and despite passage through quarter-wave plate 14, the polarized state of the light does not change.

The green light passes through dichroic mirror 13 as shown in FIG. 3. Accordingly, the green light is emitted in a direction that differs from the position of arrangement of light source 11.

When light of the first wavelength is incident to second fluorophore region 16c of fluorophore unit 16, red light is emitted from the fluorophore. This red light passes by way of the same light path as the green light that is emitted from the first fluorophore region 16b and is again incident to dichroic mirror 13. The red light passes through dichroic mirror 13 as shown in FIG. 3. Accordingly, the red light is emitted in the same direction as the green light.

When blue light that is guided from light source 11 to fluorophore unit 16 is incident to reflection region 16a of fluorophore unit 16, the blue light is reflected. The reflected blue light passes along a light path similar to that of the red light and green light that were emitted by fluorophore regions 16b and 16c and passes through collimator lens 15 and quarter-wave plate 14.

The blue light that is reflected by reflection region 16a is converted from circularly polarized light to P-polarized light by quarter-wave plate 14 and then incident to dichroic mirror 13. The P-polarized blue light passes through the dichroic mirror as shown in FIG. 3. Accordingly, the blue light that is reflected by reflection region 16a is emitted from illumination optical system 10 by way of a light path similar to that of the green light and red light.

As described hereinabove, dichroic mirror 13 functions as a polarization beam splitter with respect to light of the blue wavelength band, whereby blue light that is reflected by reflection region 16a of the fluorophore unit is emitted in a direction that differs from light source 11, i.e., in the same direction as green light and red light.

According to the above-described configuration, blue light that is reflected at reflection region 16a of fluorophore unit 16 and red light and green light that are emitted from fluorophore regions 16b and 16c all pass through the same optical system. Accordingly, a separate optical system need not be used for each wavelength of light, whereby the number of constituent parts of illumination optical system 10 can be decreased and the size of the illumination optical system can be reduced.

Light that has passed by way of dichroic mirror 13 of illumination optical system 10 is irradiated upon image formation element 22 by way of integrator 18, field lens 19, mirror 20, condenser lens 21, and TIR prism 23. Integrator 18, field lens 19, and condenser lens 21 are provided to irradiate light both uniformly and as a rectangle on image formation element 22. Integrator 18, field lens 19, mirror 20, and condenser lens 21 may be constituent elements of the illumination optical system.

Light that is incident to TIR prism 23 is reflected at air gap surface 23a in the prism to undergo a change of direction of advance and is then emitted toward image formation element 22. The angle of the light beam that is emitted to image formation element 22 is appropriately adjusted by mirror 20 and TIR prism 23.

In the projector of the present exemplary embodiment, reflective-type image formation element 22 is used. In this case, a DMD is used as reflective image formation element 22. Instead of a DMD, a liquid crystal panel (LCD), which is a transmissive-type image formation element, can also be used as image formation element 22.

A DMD has as many micro-mirror elements as the number of picture elements. Each micro mirror element is configured to allow movement by a predetermined angle around an axis of rotation. In this example, the mirror elements rotate ±12 degrees.

Light that is incident to mirror elements that are tilted +12 degrees is reflected in the direction in which projection lens 24 is arranged. Light that is incident to projection lens 24 is projected to outside the projector. Light that is incident to a mirror element tilted −12 degrees is reflected in a direction in which projection lens 24 is not arranged. In this way, each mirror element selects whether light corresponding to a picture element is projected to outside the projector. By the DMD carrying out control for the light of each color, the projector is able to display color images on a screen.

Projection lens 24 can be composed of an optical system for enlarged projection. Light of each color from illumination optical system 10 is irradiated to image formation element 22 in time divisions. Light of each color that is incident to image formation element 22 is subjected to spatial modulation according to image information that is received as input to convert to image light. The spatially modulated image light is projected onto a screen by projection lens 24.

Figure 4:
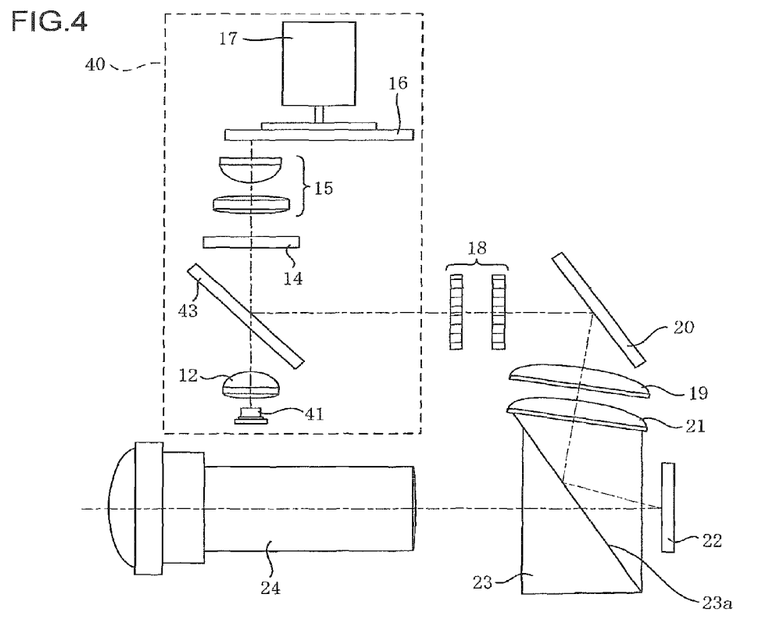
FIG. 4 is a schematic view showing the configuration of a projector that includes the illumination optical system according to the second exemplary embodiment of the present invention.

FIG. 4 is a schematic view showing the configuration of a projector that includes illumination optical system 40 according to the second exemplary embodiment of the present invention. The projector includes: illumination optical system 40, image formation element 22 that spatially modulates the light from illumination optical system 40, and projection lens 24 that projects light that has been spatially modulated by image formation element 22.

Illumination optical system 40 includes: light source 41 that emits light of the first wavelength, optical element 43, quarter-wave plate 14, and fluorophore unit 16. Quarter-wave plate 14 is provided between optical element 43 and fluorophore unit 16. Illumination optical system 40 may also have collimators 12 and 15 according to necessity.

Light source 41 in the second exemplary embodiment is preferably a blue laser that emits P-polarized excitation light. Light from light source 41 is converted to parallel light by collimator 12 and irradiated into dichroic mirror 43 that serves as the optical element.

Figure 5:
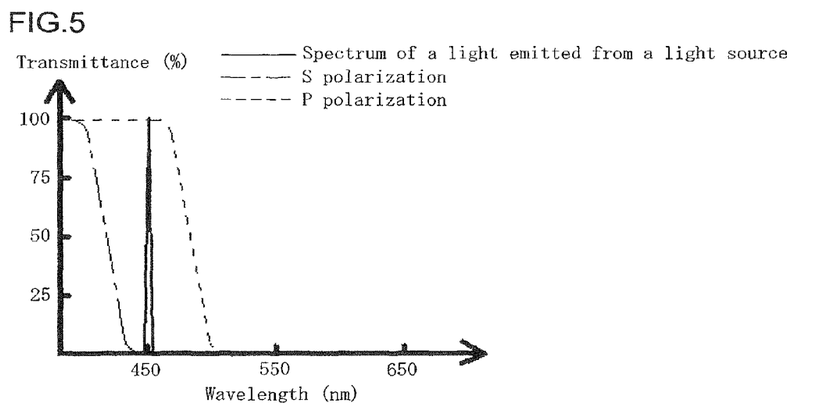
FIG. 5 is a graph showing the transmission property of light of the optical element belonging to the illumination optical system according to the second exemplary embodiment.

FIG. 5 shows the spectral transmittance characteristic of dichroic mirror 43 and the spectrum of light that is generated from light source 41. Dichroic mirror 43 has a characteristic by which the P-polarized light component of blue light is transmitted and the S-polarized light component of blue light is reflected. Dichroic mirror 43 is thus able to separate light that is emitted from light source 41 into a P-polarized light component as the first linearly polarized light component and an S-polarized light component as the second linearly polarized light component. In the present exemplary embodiment, dichroic mirror 43 guides substantially only the P-polarized light component as the first linearly polarized light component to fluorophore unit 16.

As a more specific example, with relation to the P-polarized light component, dichroic mirror 43 transmits light of wavelengths equal to or less than the wavelength of blue light and reflects light of wavelengths sufficiently longer than the wavelength of blue light. Further, relating to the S-polarized light component, the dichroic mirror transmits light of wavelengths sufficiently shorter than the wavelength of blue light and reflects light of wavelengths equal to or greater than the wavelength of blue light. Dichroic mirror 43 thus reflects the S-polarized light component and transmits the P-polarized light component in the wavelength band of blue light. The spectrum of light emitted from light source 41 belongs to the wavelength band of this blue light.

Dichroic mirror 43 can be configured from a multilayer film of dielectrics each having different refractive indices. Dichroic mirror 43 having the spectral reflectance characteristic shown in FIG. 5 is easily fabricated by appropriately adjusting, for example, the refractive indices and the film thicknesses of dielectric film or the number of laminations of dielectrics to determine a predetermined cutoff wavelength.

The P-polarized light component of blue light that is transmitted by dichroic mirror 43 passes through quarter-wave plate 14 and collimator lens 15 and is irradiated into fluorophore unit 16. The P-polarized light is converted to circularly polarized light by quarter-wave plate 14, and this circularly polarized light is condensed in fluorophore unit 16.

The configuration of fluorophore unit 16 is similar to that of the first exemplary embodiment. When blue light from light source 41 is irradiated into fluorophore regions 16b and 16c of fluorophore unit 16, light of a wavelength longer than that of the wavelength of blue light is emitted from the fluorophores. In the present exemplary embodiment, the fluorophores applied to fluorophore regions 16b and 16c emit green light or red light.

The light that is emitted from the fluorophores is changed to parallel light by collimator lens 15, passes through quarter-wave plate 14, and is again irradiated into dichroic mirror 43. As shown in FIG. 5, dichroic mirror 43 reflects red light and green light. The red light and green light that are emitted from fluorophore regions 16b and 16c are therefore reflected at dichroic mirror 42 and emitted in the same direction from illumination optical system 40.

When blue light from light source 41 is irradiated into reflection region 16a of fluorophore unit 16, the blue light is reflected, advances along the same light path as the red light and green light, and passes through collimator lens 15 and quarter-wave plate 14.

This blue light is converted from circularly polarized light to S-polarized light by quarter-wave plate 14 and irradiated into dichroic mirror 43. As shown in FIG. 5, dichroic mirror 43 reflects S-polarized excitation light, whereby the blue light that is reflected by reflection region 16a passes along the same light path as the red light and green light and is emitted from illumination optical system 40.

According to the above-described configuration, different optical systems need not be used for each wavelength of light, whereby the number of constituent parts of illumination optical system 40 is decreased and the size of the illumination optical system is also reduced.

The light reflected by dichroic mirror 43 of illumination optical system 40 is irradiated into image formation element 22 by way of integrator 18, mirror 20, field lens 19, condenser lens 21, and TIR prism 23. The light that is converted to image light by image formation element 22 is enlarged and projected onto a screen by projection lens 24. As in the first exemplary embodiment, a DMD can be used as image formation element 22.

Integrator 18, field lens 19, and condenser lens 21 are provided for illuminating light on image formation element 22 both uniformly and as a rectangle. Integrator 18, mirror 20, field lens 19, and condenser lens 21 may be constituent elements of illumination optical system 40.

Fluorophore units 10 and 40 in the above-described first and second exemplary embodiments have two types of fluorophore regions 16b and 16c. The fluorophore unit is not limited to this form and may have one type or three or more types of fluorophore regions. The wavelength of light that is emitted from each fluorophore region is selected as appropriate according to the use of the illumination optical system.

In an illumination optical system that includes a fluorophore unit having a reflection region and only one type of fluorophore region, light generated by the light source and fluorescent light that is generated by the fluorophore can be emitted in the same direction along the same light path. Accordingly, in an illumination optical system that emits two types of light, the light generated by the light source and the fluorescent light from the fluorophore, the number of constituent parts can be decreased and the size can be reduced. When a projector that displays full color is configured using this type of illumination optical system, another separate light source should be used.

Although a detailed explanation has been presented regarding preferable exemplary embodiments of the present invention, the present invention is not limited to the above-described exemplary embodiments, and it should be understood that the present invention is open to various modifications and amendments that do not depart from the gist of the present invention.

REFERENCE SIGNS LIST 10, 40 projector
11, 41 light source
12 collimator
13, 43 dichroic mirror (optical element)
14 quarter-wave plate
15 collimator
16 fluorophore unit
16a reflection region
16b fluorescent region
16c fluorescent region
17 motor
18 integrator
19 field lens
20 mirror
21 condenser lens
22 image formation element
23 TIR prism
23a air gap surface
24 projection lens

The invention claimed is:

1. A projector, comprising:
an illumination optical system;
an image formation element that spatially modulates light from the illumination optical system; and
a projection lens that projects the spatially modulated light,
wherein the illumination optical system comprises:
a light source that emits light of a first wavelength;
a fluorophore unit including a reflection region reflecting the light of said first wavelength and a fluorophore region including a fluorophore emitting fluorescent light of a wavelength that differs from said first wavelength by irradiation of the light of said first wavelength;
an optical element reflecting the light of said first wavelength; and
a quarter-wave plate provided on a light path between said optical element and said fluorophore unit.

2. The projector according to claim 1, wherein said optical element emits the light of said first wavelength reflected by said reflection region and said fluorescent light emitted by said fluorophore region in a same direction.

3. The projector according to claim 1, wherein said fluorophore unit is configured to move such that the light from said light source is successively irradiated on said fluorophore region and said reflection region.

4. The projector according to claim 1, wherein the light of the first wavelength reflected by said optical element includes a linearly polarized light component, the optical element guiding said linearly polarized light component emitted from said light source to said fluorophore unit, and the optical element being again irradiated by light reflected on said reflection region and by light emitted from said fluorophore region.

5. The projector according to claim 1, wherein the light of the first wavelength reflected by said optical element includes a linearly polarized light component, and the linearly polarized light component of light from said light source passes through said quarter-wave plate and is converted to a polarized light, said polarized light being irradiated into said fluorophore unit.

6. The projector according to claim 1, wherein the optical element separates the light of said first wavelength into a first linearly polarized light component and a second linearly polarized light component, and said optical element reflects said first linearly polarized light component of the light of said first wavelength and transmits said fluorescent light and said second linearly polarized light component of light of said first wavelength.

7. The projector according to claim 6, wherein said first linearly polarized light component comprises an S-polarized light component that is orthogonal to an incidence plane on said optical element, and said second linearly polarized light component comprises a P-polarized light component that is parallel to said incidence plane.

8. A projector, comprising:
illumination optical means;
means for spatially modulating light from the illumination optical means; and
means for projecting the spatially modulated light,
wherein the illumination optical means comprises:
means for emitting light of a first wavelength;
means including a reflection region for reflecting the light of said first wavelength and a fluorophore region including a fluorophore for emitting fluorescent light of a wavelength that differs from said first wavelength by irradiation of the light of said first wavelength; and
means for converting linearly polarized light to polarized light, said means for converting being located on a light path between said means for emitting fluorescent light and said means for reflecting.

9. The projector according to claim 8, wherein said means for reflecting emits the light of said first wavelength reflected by said reflection region and said fluorescent light emitted by said fluorophore region in a same direction.

10. The projector according to claim 8, wherein said means for reflecting is configured to move such that the light from said means for emitting is successively irradiated on said fluorophore region and said reflection region.

11. The projector according to claim 8, wherein the light of the first wavelength reflected by the means for reflecting includes a linearly polarized light component, the means for reflecting guiding said linearly polarized light component emitted from said means for emitting to said means for reflecting, and the means for reflecting being again irradiated by light reflected on said reflection region and by light emitted from said fluorophore region.

12. The projector according to claim 8, wherein the light of the first wavelength reflected by the means for reflecting includes a linearly polarized light component, and the linearly polarized light component of light from said means for emitting passes through said means for converting and is converted to a polarized light, said polarized light being irradiated into said means for reflecting.

13. The projector according to claim 8, wherein said means for reflecting separates the light of said first wavelength into a first linearly polarized light component and a second linearly polarized light component, and said means for reflecting reflects said first linearly polarized light component of the light of said first wavelength and transmits said fluorescent light and second linearly polarized light component of light of said first wavelength.

14. The projector according to claim 9, wherein said first linearly polarized light component comprises an S-polarized light component that is orthogonal to an incidence plane on said means for reflecting, and said second linearly polarized light component comprises a P-polarized light component that is parallel to said incidence plane.

15. A method of projection a fluorescent light of an excitation light, said method comprising:
- spatially modulating light from an illumination optical system;
- projecting the spatially modulated light;
- emitting, by a light source, light of a first wavelength;
- reflecting, by a fluorophore unit including a reflection region, the light of said first wavelength;
- emitting, by said fluorophore unit further including a fluorophore region including a fluorophore, fluorescent light of a wavelength that differs from said first wavelength by irradiation of the light of said first wavelength;
- reflecting, by an optical element, the light of said first wavelength; and
- converting, by a quarter-wave plate, a linearly polarized light to polarized light, the quarter-wave plate being located on a light path between said optical element and said fluorophore unit.

16. The method according to claim 15, wherein, in said reflecting the light of said first wavelength, said optical element emits the light of said first wavelength reflected by said reflection region and said fluorescent light emitted by said fluorophore region in a same direction.

17. The method according to claim 15, wherein said fluorophore unit is configured to move such that the light from said light source is successively irradiated on said fluorophore region and said reflection region.

18. The method according to claim 15, wherein the light of the first wavelength reflected by said optical element includes a linearly polarized light component, the optical element guiding the linearly polarized light component emitted from said light source to said fluorophore unit, and the optical element being again irradiated by light reflected on said reflection region and by light emitted from said fluorophore region.

19. The method according to claim 15, wherein the light of the first wavelength reflected by said optical element includes a linearly polarized light component, and the linearly polarized light component of light from said light source passes through said quarter-wave plate and is converted to a polarized light, said polarized light being irradiated into said fluorophore unit.

20. The method according to claim 15, wherein, in said reflecting the light of said first wavelength, the optical element separates the light of said first wavelength into a first linearly polarized light component and a second linearly polarized light component, and said optical element reflects said first linearly polarized light component of the light of said first wavelength and transmits said fluorescent light and said second linearly polarized light component of light of said first wavelength.

* * * * *